Feb. 20, 1940.  J. W. ELLIS ET AL  2,190,938
GAUGE COCK
Filed June 21, 1937
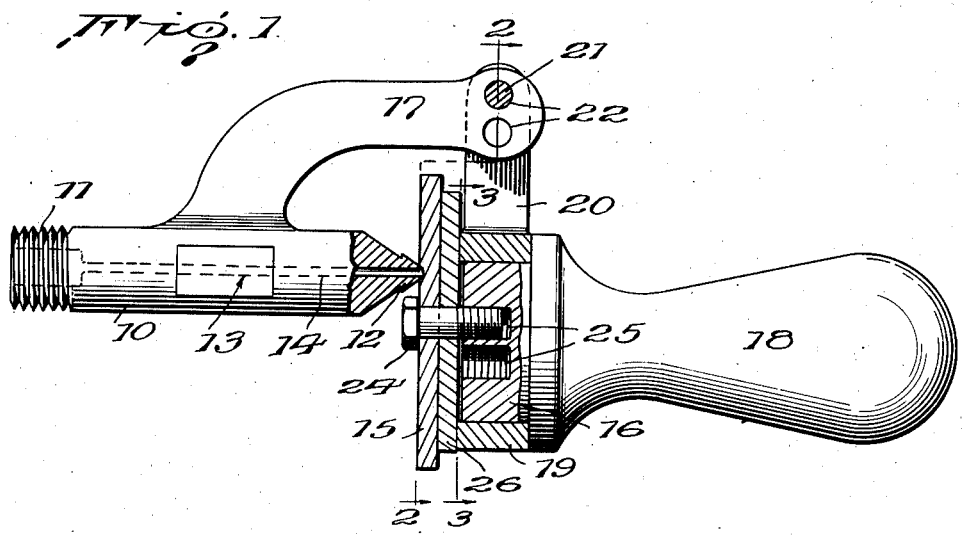
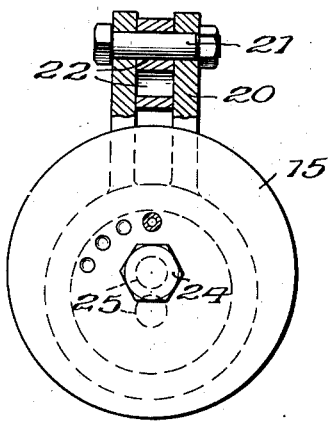
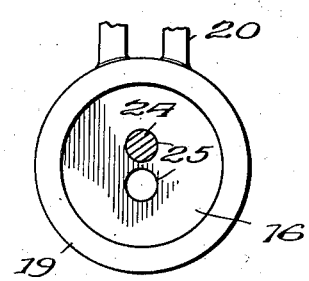
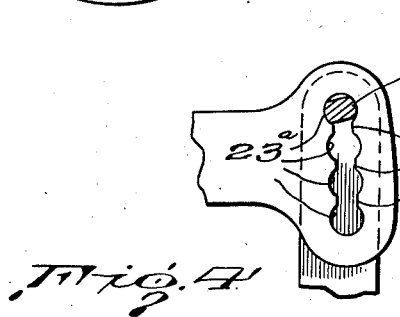
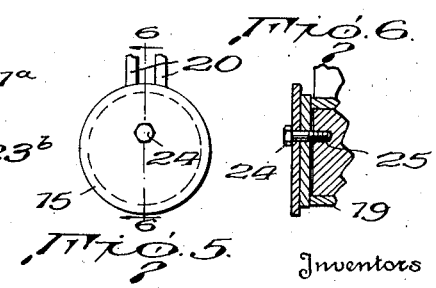
Inventors
John W. Ellis
Walter J. Davidson,
By Chuch & Chuch
Their Attorneys Patented Feb. 20, 1940

2,190,938

UNITED STATES PATENT OFFICE 2,190,938

GAUGE COCK

John W. Ellis and Walter J. Davidson, Shreveport, La., assignors to Alva G. Blanchard, Shreveport, La.

Application June 21, 1937, Serial No. 149,521

14 Claims. (Cl. 251—126)

This invention relates to improvements in gauge cocks and especially to high pressure boiler gauge cocks.

The primary object of the invention is to provide an improved gauge cock having a large seating capacity with means for conveniently and expeditiously altering the position of the seating member to provide a new seating surface.

A further object is to provide a gauge cock in which the seating member is capable of being adjusted to provide an increased number of seating surfaces for the steam nozzle.

More particularly, the invention contemplates a gauge cock comprising a seating member associated with the discharge nozzle in such fashion that the seating member, which is rotatable, may be adjusted radially of its center of rotation, and said center of rotation may be adjusted transversely of the nozzle, whereby the nozzle can be caused to engage the seating member at any one of a great number of points on the surface of the latter.

With these and other objects in view, the invention consists in certain details of construction and combinations and arrangements of parts, all as will hereinafter be more fully described and the novel features thereof particularly pointed out in the appended claims.

In the accompanying drawing—

Figure 1 is a side elevational view of a nipple or nozzle with the seating member and a portion of the mounting of the latter shown in section;

Fig. 2 is a sectional view on the line 2—2 of Fig. 1;

Fig. 3 is a similar view on the line 3—3 of Fig. 1;

Fig. 4 is a detail view of a modified form of the pivotal mounting for the seating member support;

Fig. 5 is a front elevation of a modified form of the invention; and

Fig. 6 is a sectional view on the line 6—6 of Fig. 5.

The nipple 10 has a flattened portion 13 intermediate its ends for application of a wrench in installing the nipple. The nipple is also provided with an axial bore or steam passage 14 and one end of said nipple is threaded as at 11, while its opposite or discharge end 12 is tapered or of conical shape and constitutes the nozzle.

The seating member for normally closing said nozzle 12 is formed of a disc 15 of soft metal, such as a composition of lead and babbitt, so that, when the disc is moved forcibly into engagement with the tapered nozzle, the latter will indent said disc, thus automatically forming a recess in which the nozzle neatly fits to effectively close and seal said nozzle. This seating disc is adapted to be rotated in order to permit adjustment thereof relatively to the nozzle, whereby the nozzle will engage the disc at successive points disposed in a circle on the disc. Also, to increase the number of points at which the disc can be caused to engage the nozzle, the present invention proposes mounting the disc in such fashion that the center of rotation of the disc can be varied and the position of the disc, relatively to its center of rotation, can be varied radially of said center.

As previously stated, the disc, preferably, is adapted to impact forcibly against the nozzle and for this purpose the disc is mounted on a weighted head 16 pivotally suspended from a bracket 17 which may be cast integrally with the nipple and overhangs the nozzle end of the nipple. Head 16 has a handle portion 18 to facilitate raising the head on its pivotal center.

Preferably, the disc 15 is rigidly, but detachably, mounted on head 16 and said head is embraced by a split expansible collar 19. The ends of the collar are offset as at 20 and a pivot pin 21 extends through said ends and the bracket 17. A nut of any desired type may be provided on the bolt or pivot pin 21 for convenience in tightening and loosening the engagement of the collar 19 around head 16. In other words, the collar normally tightly engages around the head so the latter cannot rotate therein, but can only be swung on the pivot 21, but, when it is desired to rotate the head, and with it disc 15, it is only necessary to loosen said wing nut and thus relieve the compression exerted on the collar. Usually the head is released for rotation before the disc is disengaged from the nozzle when making rotary adjustment of the disc for presenting a new seating surface to the nozzle. As will be understood, successive rotary adjustments of the head and disc will ultimately result in a circular series of seating indentations being formed in the disc and, in order to increase the number of points at which the nozzle and disc may be caused to engage each other, the offset ends 20 of collar 19 are formed with a plurality of openings 22 for reception of pivot pin 21. As a result, when one circle of seat indentations is completed, the collar ends may be adjusted to present a different opening 22 for pin 21, thus altering the center of rotation of the head relatively to nozzle 12, whereupon the nozzle will engage the disc at points in a different circular line or path. Instead of forming a series of openings 22 in the collar ends for this purpose, the overhanging end of bracket 17 can be enlarged and formed with a slot having alternate enlarged and restricted portions 23a, 23b, respectively, and the collar ends may be provided with a pin 21a having a major and minor cross-sectional dimension, as shown in Fig. 4. With this construction, the pin 21a will be retained in one of the enlarged portions 23a of the slot until turned to present its minor dimension to a restricted portion 23b of the slot, whereupon it can be moved through said restricted portion to position it in another enlarged portion and thus alter the location of the center of rotation of the head relatively to the nozzle.

In order to permit further adjustment of the seating disc relatively to nozzle 12 and permit the use of a larger area of the disc by providing for engagement of the nozzle and disc at a still greater number of points on the face of the disc, the latter is fixed on the head 16 by a cap screw 24 adapted to be received in any one of a number of tapped holes 25 in the head and spaced radially of the center of rotation of said head. With this arrangement, the several adjustments of the center of rotation of the head relatively to the nozzle may be used first and then the position of the disc on the head may be varied and each one of these adjustments will cause the disc and nozzle to engage in a different circular series of points, thus permitting a comparatively large area of the disc being used before it is necessary to reverse the disc on the head or to detach the disc and hammer it to remove the several indentations.

If desired, a backing member 26 may be provided for the seating disc 15, said member being held in place on the head by the cap screw 24. The several parts of the device may be formed of suitable metals and favorable results have been had using a composition of copper and bronze for the nipple and malleable iron castings for the head and handle. The split collar is preferably made of non-corrosive spring steel.

It will be readily appreciated that the several adjustments provided for in the present device add greatly to the life or usefulness of the seating member or disc.

In the modified form of the appliance illustrated in Figs. 5 and 6, the openings for cap screw 24 and in seating member 15 and in the head 16, are formed eccentrically of said member and head, respectively. This permits adjustment of the seating member with respect to the head by simply loosening screw 24 and each adjustment of the member, in this manner, will cause the nozzle to engage a new circular series of points on the member. The center of rotation of the head can also be varied relatively to the nozzle, as previously described in the first form of the appliance so as to greatly increase the number of points of contact between the nozzle and seating member. This form of the invention is quite advantageous in that, when it is desired to alter the position of the seating member on the head, the cap screw can be backed off slightly to release said member and the latter rotated by simply relieving the pressure of the nozzle on the member.

What we claim is:

1. In a gauge cock, a nipple, a rotatable seating member normally engaging one end of the nipple for closing the latter, and means for varying the location of the center of rotation of said member relatively to said nipple, the point of engagement of the nipple against said member being variable by varying the location of said center of rotation.

2. In a gauge cock, a nipple, a rotatable head movable toward and from said nipple, means for varying the location of the center of rotation of said head relatively to the nipple, and a seating member on said head normally engaging and closing one end of said nipple, the point of engagement of the nipple against said member being variable by said varying of the location of said center of rotation.

3. In a gauge cock, a nipple, a seating member normally engaging and closing one end of said nipple, a pivoted support movable toward and from the nipple, a rotary head in said support, and means for securing said member on said head eccentrically of the latter.

4. In a gauge cock, a nipple, a rotary support movable toward and from said nipple, means for varying the location of the center of rotation of the support relatively to said nipple, and a seating member carried by said support normally engaging and closing one end of said nipple, said member being secured eccentrically of said support.

5. In a gauge cock, a nipple, a rotary support pivoted to swing toward and from said nipple, means for adjusting the support relatively to its pivotal center to vary the location of the center of rotation thereof relatively to the nipple, and a seating member on said support normally engaging and closing one end of said nipple.

6. In a gauge cock, a nipple, a rotary support pivoted to swing toward and from said nipple, means for adjusting said support relatively to its pivotal center to vary the location of the center of rotation thereof relatively to the nipple, and a seating member on said support normally engaging and closing one end of said nipple, said member being secured on the support eccentrically of the center of rotation of the latter.

7. In a gauge cock, a nipple, a rotary seating member normally engaging and closing one end of said nipple, means for swinging said member on a pivotal center toward and from said nipple, means for adjusting said member relatively to said pivotal center toward and from the nipple, and means for adjusting said seating member relatively to said swinging means.

8. In a gauge cock, a nipple, a bracket overhanging one end of said nipple, a support adjustably and pivotally secured on said bracket to swing toward and from said end of the nipple, and a seating member on said support, said member being rotatable relatively to said nipple.

9. In a gauge cock, a nipple, a bracket overhanging one end of said nipple, a support adjustably and pivotally secured on said bracket to swing toward and from said end of the nipple, and a seating member on said support, said member being rotatable relatively to said nipple, and adjustable on said support in a plane transverse of said nipple.

10. In a gauge cock, a nipple, a bracket overhanging one end of said nipple, a weighted head, means pivoted on said bracket for rotatably supporting said head, means for adjusting said support relatively to its pivotal center and relatively to the nipple, and a seating member mounted on said head normally engaging and closing one end of said nipple.

11. In a gauge cock, a nipple, a bracket overhanging one end of said nipple, a weighted head, means pivoted on said bracket for rotatably supporting said head, means for adjusting said support relatively to its pivotal center and relatively to the nipple, and a seating member mounted on said head normally engaging and closing one end of said nipple, said seating member being mounted on said head eccentrically of the axis of the latter.

12. In a gauge cock, a nipple, a rotary support pivoted to swing toward and from said nipple, means for adjusting said support relatively with respect to the nipple, a seating member mounted on said support normally engaging and closing one end of the nipple, and means for selectively mounting said member on the support at a plurality of points disposed eccentrically of the center of rotation of the support.

13. In a gauge cock, a nipple, a rotary head swingable toward and from one end of the nipple, a seating member mounted on said head normally engaging and closing one end of the nipple, and means for selectively securing said member on the head at a plurality of points disposed eccentrically of the center of rotation of the head to vary the point at which said nipple engages said seating member.

14. In a gauge cock, a nipple, a rotatable head, and a seating member normally engaging one end of the nipple for closing the latter, said member being rotatably secured on said head eccentrically of the head, and said member being disposed eccentrically of its center of rotation.

JOHN W. ELLIS.
WALTER J. DAVIDSON.